United States Patent
Schölz et al.

(10) Patent No.: US 11,602,816 B2
(45) Date of Patent: Mar. 14, 2023

(54) METHOD FOR CUTTING REFRACTORY METALS

(71) Applicant: Heraeus Deutschland GmbH & Co. KG, Hanau (DE)

(72) Inventors: Friedhold Schölz, Hanau (DE); Egbert Stiedl, Hanau (DE); Bernd Spaniol, Hanau (DE); Norbert Traeger, Hanau (DE); Werner Feuring, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 810 days.

(21) Appl. No.: 16/476,497

(22) PCT Filed: Nov. 20, 2017

(86) PCT No.: PCT/EP2017/079770
§ 371 (c)(1),
(2) Date: Jul. 8, 2019

(87) PCT Pub. No.: WO2018/130327
PCT Pub. Date: Jul. 19, 2018

(65) Prior Publication Data
US 2020/0055157 A1    Feb. 20, 2020

(30) Foreign Application Priority Data
Jan. 10, 2017  (EP) ..................... 17150817

(51) Int. Cl.
*B23Q 11/10*     (2006.01)
*B23D 57/00*     (2006.01)
(Continued)

(52) U.S. Cl.
CPC .......... *B23Q 11/1061* (2013.01); *C25D 11/26* (2013.01); *B23D 57/003* (2013.01); *B23D 59/02* (2013.01); *B23D 59/04* (2013.01)

(58) Field of Classification Search
CPC .................. B23Q 11/10–1092; B23D 57/003
(Continued)

(56) References Cited

U.S. PATENT DOCUMENTS 4,995,541 A * 2/1991 Seidinger ............. B21D 43/021
                                                   226/174
5,156,720 A * 10/1992 Rosenfeld ............... C25D 11/02
                                                   205/138
(Continued)

FOREIGN PATENT DOCUMENTS

CN          101797713 A       8/2010
JP          H11264064 A       9/1999
(Continued)

OTHER PUBLICATIONS

Saito, et al., Multi-wire Slicing of Large Grain Ingot Material. Proceedings of SRF2009, Cavity Preparation and Production, Berlin Germany, 467-472.

(Continued)

*Primary Examiner* — Sean M Michalski
(74) *Attorney, Agent, or Firm* — Blank Rome LLP

(57) ABSTRACT

The invention relates to a method for cutting refractory metals, in which a solid body (1) made of a refractory metal is mechanically machining cut with a cutting apparatus (4, 7), wherein the cutting apparatus (4, 7) is wetted for cutting with a fluid (6) having at least 50 weight % water, wherein the cutting apparatus (4, 7) is brought to a positive electrical potential in relation to the solid body (1) during cutting. The invention also relates to a disc produced from a refractory metal using such a method, and such a disc that has an oxide layer with a thickness of between 2 nm and 1,000 nm on the cutting surface.

20 Claims, 2 Drawing Sheets

Figure 1:
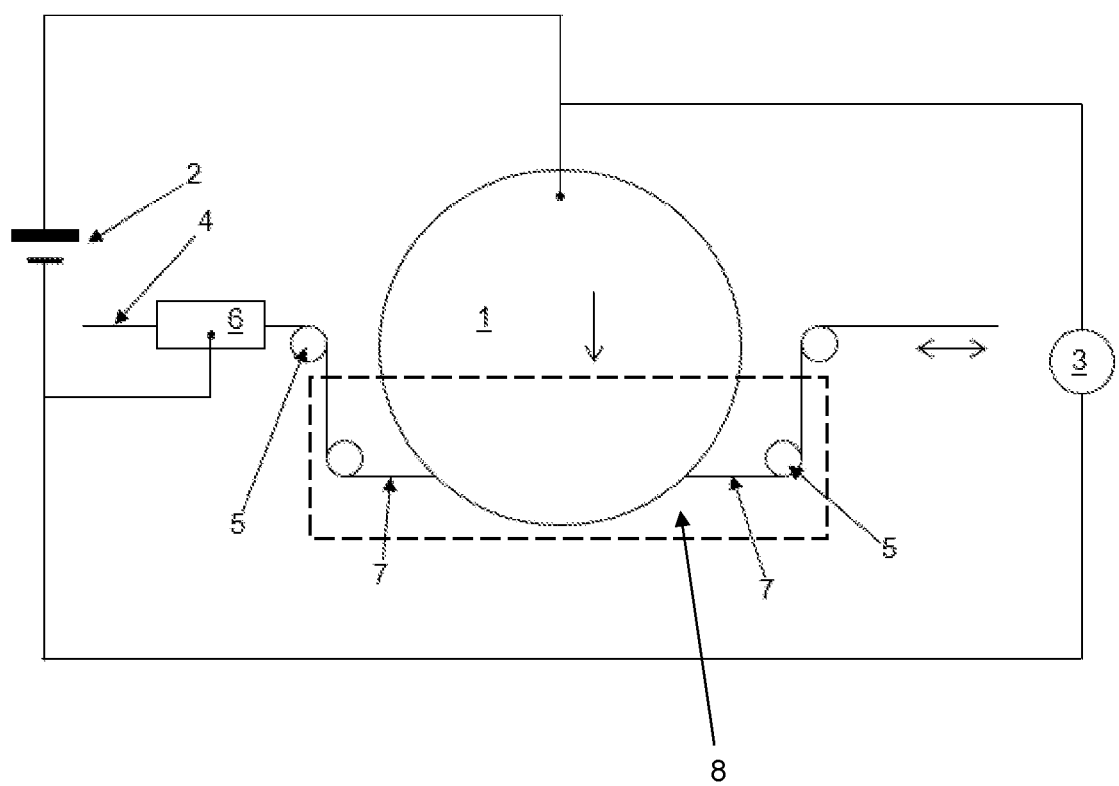

(51) Int. Cl.
*B23D 59/02* (2006.01)
*B23D 59/04* (2006.01)
*C25D 11/26* (2006.01)

(58) Field of Classification Search
USPC .................................................... 428/472.1
See application file for complete search history.

(56) References Cited

U.S. PATENT DOCUMENTS

| | | | |
|---|---|---|---|
| 8,324,134 B2* | 12/2012 | Saito | B21D 22/20 |
| | | | 505/401 |
| 9,359,669 B2* | 6/2016 | Clemens | C23C 14/3414 |
| 11,548,046 B2* | 1/2023 | Latouche | B21C 51/00 |
| 2001/0037667 A1* | 11/2001 | Leroux | B21B 45/06 |
| | | | 72/39 |
| 2002/0157736 A1* | 10/2002 | Michaluk | C22F 1/18 |
| | | | 148/668 |
| 2006/0115372 A1 | 6/2006 | Kumar et al. | |
| 2006/0207326 A1* | 9/2006 | Moody | G01V 7/005 |
| | | | 73/382 R |
| 2009/0211667 A1 | 8/2009 | Suzuki et al. | |
| 2009/0215631 A1* | 8/2009 | Singer | H05H 7/18 |
| | | | 228/103 |
| 2011/0009965 A1 | 1/2011 | Ankem | |
| 2011/0130294 A1 | 6/2011 | Saito et al. | |
| 2011/0162425 A1* | 7/2011 | Hof | C09K 23/00 |
| | | | 508/579 |
| 2011/0247383 A1* | 10/2011 | Whitworth | B21F 99/00 |
| | | | 72/54 |
| 2013/0075274 A1 | 3/2013 | Wang et al. | |
| 2016/0184908 A1* | 6/2016 | Zhu | B23D 57/0053 |
| | | | 83/788 |
| 2020/0343433 A1* | 10/2020 | Boukai | G04G 21/025 |

FOREIGN PATENT DOCUMENTS

| | | |
|---|---|---|
| JP | 2003129152 A | 5/2003 |
| JP | 2007335118 A | 12/2007 |
| JP | 2013144330 A | 7/2013 |
| WO | WO-2004069453 A2 | 8/2004 |

OTHER PUBLICATIONS

International Search Report issued in PCT/EP2017/079770, dated Mar. 15, 2018.

Kar, et al., Oxidation of Tantalum with Mechanical Force, Electrochemical and Solid-State Letters, 2008, 11:2:C13-C17.

Romand, et al., Concentration Profiles of Passive Films Formed on Niobium Metal and Niobium-base Alloys by Auger Electron Spectrometry, Mat. Res. Bull., 1976, 11:517-524.

* cited by examiner

METHOD FOR CUTTING REFRACTORY METALS

This application is a national stage of International Patent Application No. PCT/EP2017/079770, filed Nov. 20, 2017, which claims the benefit of European Application No. 17150817.9, filed Jan. 10, 2017, each of which are hereby incorporated by reference in their entirety.

The invention relates to a method for cutting refractory metals, in which a solid body made of a refractory metal is mechanically machining cut with a cutting apparatus.

Discs made of highly pure refractory metals are required for different applications. Thin sheets or discs made of niobium are thus required for the production of superconductive cavities, wherein these discs should contain as few impurities as possible consisting of oxygen (O), nitrogen (N), hydrogen (H) or other gases, since these negatively influence the superconductive properties, in particular the residual resistance ratio.

A method for producing discs made of niobium (Nb) from a niobium solid body is known from US 2011/0130294 A1. Here, several vibrating wires are used to cut the discs from the solid bodies, which are sprayed with abrasive grains, so that the solid body is cut.

The disadvantage here is that during cutting, oxygen, nitrogen and hydrogen and other impurities enter the discs. These must then be removed again. Refractory metals tend to absorb O, N and H by the water or the oil cracking on the reactive, newly created metal surface during processing with water or oil. The gases which are then interstitially released embrittle the refractory metals. H can be removed through simple vacuum thermal treatment. O and N remain bound, however, and can only be removed from the metal by applying stronger getter and diffusion annealings with subsequent removal of the getter layer. For this purpose, a getter must first be applied to the surface, for example through sputtering or vaporization. The bond must be thermally treated in the vacuum, so that the released gases diffuse into the getter. The getter layer must then be removed. Pickling can be used for this purpose. The process described involves a large amount of time and high costs. Taking the production of niobium discs as an example, these measures therefore make the production of superconductive cavities very expensive.

The object of the invention is therefore to overcome the disadvantages of the prior art. In particular, a method for cutting refractory metals from a solid body is to be provided that can be implemented easily, quickly and at low cost. The object is therefore to avoid such costly post-treatments by avoiding the absorption of O, H and N. The method should be realisable at low cost and require as few as possible additional method steps for the subsequent cleaning and post-processing. The disc produced should be completed as far as possible for subsequent processing. Here, the cutting itself must not be expensive. Here, as far as possible, impurities, in particular oxygen, nitrogen and/or hydrogen, should be prevented from penetrating into the interior of the discs produced or of the cut-off bodies. The discs or bodies of the refractory metal produced should have the highest possible degree of purity, and also contain no gaseous elements under normal pressure and at room temperature.

The objects of the invention are attained by means of a method for cutting refractory metals in which a solid body made of a refractory metal is mechanically machining cut with a cutting apparatus, wherein the cutting apparatus is wetted for cutting with a fluid having at least 50 weight % water, wherein the cutting apparatus is brought to a positive electrical potential in relation to the solid body during cutting.

The aqueous fluid preferably contains more than 70 weight % water and a particular grinding agent, wherein the particles of the grinding agent form a sludge with the water. Such an aqueous fluid is known as slurry. The electrical voltage can preferably be transferred via the fluid or the slurry onto the cutting apparatus.

It can be provided that the cutting surface of the solid body is oxidized on the surface by the positive electrical potential of the cutting apparatus in relation to the solid body and by the aqueous fluid so that an oxide layer forms on the cutting surface during cutting, wherein an amorphous oxide layer preferably forms on the cutting surface.

A protective layer in the form of a protective oxide layer, against the penetration of nitrogen, hydrogen, oxygen and/or other gases into the refractory metal and for preventing the cracking of water molecules on the refractory metal surface, is thus produced, wherein with the protective oxide layer, an advance of water molecules onto the metal surface and the penetration of interfering gases into the refractory metal can be prevented or at least reduced. The purity of the cut-off body from the refractory metal can thus be retained or remain at a high level.

Here, it can in turn be provided that due to the oxide layer formed during cutting, an absorption of hydrogen and oxygen through the oxide layer into the interior of the solid body is reduced or prevented, wherein the absorption of nitrogen and/or carbon and/or other gases through the oxide layer into the interior of the solid body is preferably also reduced or prevented.

As a result, it is ensured that the protective oxide layer passivates the newly created surface of the solid body, and is also impermeable, or largely impermeable, for the above-named impurities, so that the cut-off part of the refractory metal has a particularly high degree of purity in the interior (in the bulk) or is at least produced with a low level of impurities of these gases, in particular with a low level of oxygen and hydrogen. Due to the refractory metal oxide layer that is created, a cracking of water molecules on the freshly cut refractory metal surface is prevented. As a result, the number of free radicals present on the surface of the solid body, i.e. of atomic hydrogen and oxygen, is drastically reduced and their absorption in the solid body is prevented.

It can be provided according to the invention that due to the refractory metal oxide layer that is formed during cutting, a cracking of water molecules on the surface of the cut solid body is reduced or prevented.

It is thus avoided that in the area of the surface of the cut refractory metal, free atomic hydrogen atoms and oxygen atoms are present, which can easily penetrate into the interior of the solid body, and which chemically react with the refractory metal due to their high reactivity.

It can also be provided that as a cutting apparatus, a blade of a saw device is used, preferably a wire of a wire saw, a thread of a thread saw, a band of a band saw, a saw blade of a hacksaw, a circular saw blade of a circular saw or a cutting disc is used, wherein in a particularly preferred manner, the wire saw or the thread saw is used.

These cutting apparatuses, in particular the wire of the wire saw and the thread of the thread saw, can be used to produce very low-cost cuts of the refractory metals which are not easy to process at room temperature. At the same time, with these cutting apparatuses, a voltage can easily be applied between the cutting apparatus and the solid body to be cut, so that the method can be implemented and controlled safely and at a low cost.

According to a further development of the method according to the invention, it can be provided that as a cutting apparatus, a wire of a wire saw or a thread of a thread saw is used, and as a fluid, an aqueous sludge (known as slurry) is used, in which grinding particles are distributed, wherein the grinding particles are preferably selected from quartz particles, tungsten carbide particles and diamond particles or mixtures of these.

The grinding particles preferably have a particle size of between 1 μm and 100 μm.

These methods can also be implemented in a particularly low-cost manner, and can be completed without a high penetration of oxygen and hydrogen into the refractory metal, so that these methods are particularly suited to the implementation of the method according to the invention.

It can preferably also be provided that the solid body is crystalline, preferably rough crystalline or monocrystalline.

The use of the method on highly pure crystalline solid bodies is particularly advantageous, since low-level impurities can already have a disadvantageous effect there.

Here, it can be provided that on the cutting plane, the solid body has no more than 100 monocrystalline areas, preferably not more than 20 monocrystalline areas, particularly preferred, not more than 10 monocrystalline areas.

The physical and mechanical properties of rough-grain and highly pure niobium are here particularly advantageous for use for deep-drawing resonator cells for accelerator structures.

Expansions of 85 to 95% are achieved. Due to the high level of purity of the material, there are almost no segregations, so that the grain boundaries do not constrict during the tensile test. Despite an extremely rough grain, an excellent deep-drawing capacity is provided due to the extremely high expansion values. Every grain boundary and every impurity can interfere with the magnetic field (up to 40 MeV acceleration voltage) applied in order to accelerate the fine particles (electrons/positrons), and thus lead to a failure of the cavity. The rougher the grain structure, the lower the number of grain boundaries and thus the lower the risk of a magnetic field interference.

Furthermore, it can be provided that between the solid body and the cutting apparatus, an electrical voltage of at least 1 V is applied during cutting, preferably an electrical voltage of between 5 V and 200 V is applied.

In a very particularly preferred manner, an electrical voltage of between 5 V and 50 V is applied. With these voltages of at least 1 V, or at least 5 V, a positive effect can be achieved with regard to the strength of the protecting oxide layer and thus with the protective impact with regard to cracking of water molecules and gases that penetrate in an unwanted manner. At the same time, with voltages of 200 V and less, it can be prevented that by means of the resulting currents, the freshly cut surface is heated and a change in the structure of the cutting surface or of the entire part that is to be cut or that has been cut off from the solid body is prevented as a result.

According to a preferred further development of the present invention, it can be provided that the cutting apparatus is brought to an electrically positive potential in relation to ground, wherein the solid body is preferably brought to ground potential.

As a result, the deposition of oxygen ions in the area of the cutting surface can be increased, in order to form a protective oxide layer on the cutting surface as quickly as possible.

Preferably, it can also be provided that the solid body consists of a refractory metal of the main chemical group IVb, Vb or VIb.

When applying the method according to the invention to these refractory metals, the method has a particularly advantageous impact since these metals cannot be easily cut using other methods, and the removal of impurities via oxygen can only be achieved with a higher level of effort.

It can further be provided that the solid body consists of titanium, tantalum, niobium, vanadium, zirconium, molybdenum or tungsten, wherein titanium, tantalum, niobium and zirconium are particularly preferred and niobium is very particularly preferred.

These refractory metals represent large cost advantages as a high degree of purity is possible without extensive post-treatment with the method according to the invention.

According to one preferred design of the method according to the invention, it can be provided that discs are cut off from solid bodies.

Discs are particularly easy to cut off as a geometry, which is also subsequently suitable for a large number of applications for further processing.

It can additionally be provided that the solid body consists of a highly pure refractory metal, wherein the purity of the refractory metal is at least 3N, preferably at least 4N.

With these purities, the method according to the invention has a particularly advantageous impact.

With one further development, it is recommended that the solid body is positioned in a bath of the aqueous fluid during cutting, and the cutting apparatus is guided at least partially through the bath during cutting.

It is hereby ensured that a sufficient quantity of water or a sufficient density of water molecules is available on the surface for the rapid formation of the protective oxide layer. Thus, the newly created surface can already be protected against penetrating impurities during cutting. Additionally, processing in an aqueous medium is particularly simple and low-cost.

For the preparation for subsequent use, it can be provided that the oxide layer on the surface of the cut-off disc is removed by pickling after cutting.

The surface of the cut-off disc is thus freed from the protective oxide layer, and as a result, a highly pure disc of the refractory metal is prepared for subsequent further processing that has been produced with a low-cost method.

The objects that form the basis of the present invention are also attained by means of a disc made of a refractory metal with a method according to the invention.

The objects that form the basis of the present invention are further attained by means of a disc produced from a refractory metal, with a method according to the invention, without removal of the oxide layer, wherein the disc has an oxide layer with a thickness of between 2 nm and 1,000 nm on the cutting surface, preferably between 10 nm and 500 nm.

A sufficiently stable oxide layer is thus guaranteed during cutting in order to prevent further impurities, with which the metal surface is passivated, so that a cracking of water molecules on the metal surface is at least reduced, and through which unwanted impurities cannot simply penetrate.

Here, it can be provided that the disc has an amorphous oxide layer on the cutting surface.

This amorphous oxide layer is particularly well suited to the passivation of the refractory metal surface and to the prevention of further impurity, and also remains stable on the surface of the refractory metal.

Preferably, it can also be provided that the interior of the disc has an oxygen content of less than 20 µg/g, preferably less than 10 µg/g.

Finally, it can also be provided that the interior of the disc has a hydrogen content of less than 10 µg/g, preferably less than 3 µg/g.

A highly pure disc of the refractory metal is thus provided which is particularly well suited to further processing.

The invention is based on the surprising new finding that by applying a positive potential on a cutting apparatus, using an aqueous fluid, a protective oxide layer can be produced on the freshly created surface of the cut refractory metal, so that an advance of water molecules towards the refractory metal surface is prevented, in order to prevent a cracking of water molecules on the refractory metal surface and a subsequent absorption of atomic hydrogen and oxygen, and, already during cutting, a further absorption of impurities can be prevented. In contrast to the expectation that an additional deposition of oxygen into the freshly cut surface is provoked through the positive charge of the cutting apparatus against the solid body to be cut, and that, as a result, the deposition of oxygen into the interior of the solid body or the freshly cut disc increases, it was found, within the scope of the present invention, that as a result, an oxide layer is produced in the short term, which prevents a further deposition of oxygen, hydrogen, nitrogen and other interfering gases. Due to the negative potential of dissociated oxygen ($O^-$), it could actually be assumed that an applied negative potential on the body to be protected would have a repellent impact on the $O^-$ ions, and that the absorption of O would thus be prevented.

Surprisingly, a positive potential is shown to be effective in that the diffusion in of O is prevented or is at least strongly reduced due to the rapid formation of a new stable refractory metal oxide layer. At the same time, an inward diffusion of other interfering impurities, such as N and H, is prevented or at least strongly reduced by the oxide layer.

The discs must be cut from the ingot, i.e. from the solid body. Sawing with a hacksaw or a band saw is disadvantageous due to the required thickness tolerances of +/−0.1 mm with a thickness of 2.8 mm and a diameter of 265 mm. Eroding the wire is too expensive due to the low erosion rates with Nb and other refractory metals.

When the method according to the invention is applied to Nb for the production of niobium discs, with 72-hour aqueous grinding processing, no O absorption could be ascertained (measurement sensitivity+/−1 µg/g).

Figure 2:
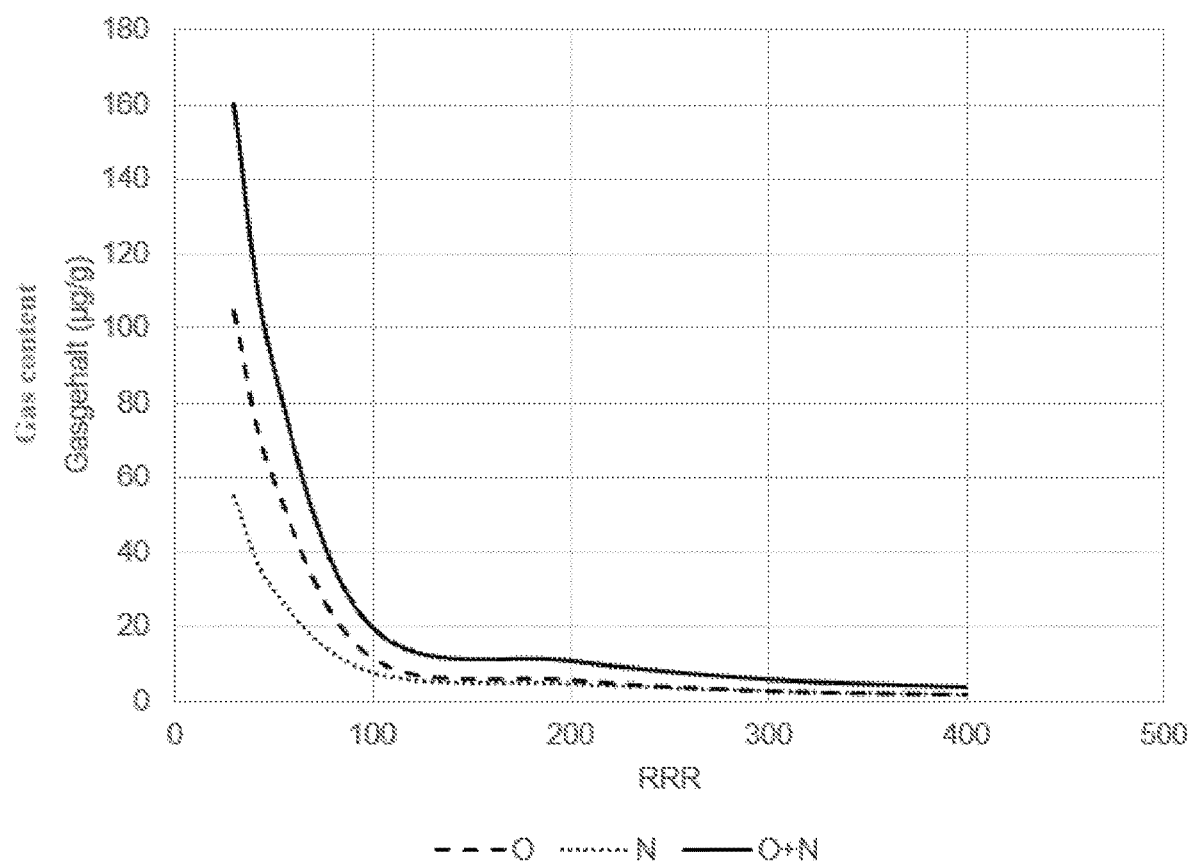

Below, an exemplary embodiment of the invention will be explained with reference to a schematically shown figure and a diagram, without however limiting the invention, in which:

FIG. 1: shows a schematic view of a device for implementing a method according to the invention, and FIG. 2: shows a diagram in which the RRR value of niobium is shown in dependence on the content of O and N and the total of O and N.

FIG. 1 shows a schematic view of a device for implementing a method according to the invention. With the device, a cylindrical solid body 1 of a refractory metal is cut into discs. For example, the solid body 1 consists of highly pure Nb with gas contents (O, N, H, C) that total less than 20 µg/g and residual resistance ratios RRR of over 300. Such niobium is used for particle acceleration in a superconductive state at low temperatures in hollow space resonators known as cavities. The residual resistance ratio RRR is the quotient of the electrical resistance at room temperature and of electrical resistance directly above the transition temperature to the superconductor. The RRR value is a comparative value for the cryogenic thermal conductivity of the material.

A refining of standard Nb (gas contents approx. 200 µg/g) occurs by multiple electron beam remelting under vacuum conditions of better than $10^{-5}$ mbar and temperatures of approx. 3,000° C. The resonator cells are usually welded from deep-drawn, rolled sheets. In order to minimise the contamination of the highly pure Nb during the process of removal from the melt block to the sheet, a considerable number of grinding and pickling procedures are required.

An electrical pole of an electrical voltage source 2, the electrical voltage of which can be measured with a voltmeter 3, is connected to the solid body 1 made from the refractory metal, in particular from Nb. The solid body 1 is cut with a wire saw. The wire saw comprises a copper-plated steel wire 4, which is guided over movable deflection rollers 5. The copper-plated steel wire 4 is here guided through a bath of an aqueous slurry 6. The slurry 6 contains water and particles of a grinding agent, and is formed by slurrying the component parts.

The steel wire 7 wetted with the slurry 6 cuts the solid body 1 into discs with the aid of the particles of the grinding agent. For this purpose, the copper-plated steel wire 7 that is wetted with slurry is suitably guided through the solid body 1 with the deflection rollers 5. The slurry 6 and thus also the steel wire 4, 7, is electrically connected to the other pole of the voltage source 2, so that the steel wire 7 wetted with slurry lies opposite the solid body 1 on positive electrical potential. However, a converse polarity can also be used with the structure for test purposes (see below). For this purpose, the electrical voltage can be variably set with the voltage source 2. In some instances, the solid body 1 is positioned in a bath 8 of the slurry 6 during cutting, and the cutting apparatus (as shown in FIG. 1, the steel wire 7) is guided at least partially through the bath 8 during cutting.

An anodic switching of an Nb solid body 1 or refractory metal solid body 1 appears at first to be illogical. However, due to the targeted structuring of a closed, amorphous NbO layer or refractory metal oxide layer, a further inward diffusion of O and other impurities, such as N and H, is surprisingly prevented. Here, the creation of a passivating oxide layer is largely responsible, which prevents a chemical cracking of water molecules on the refractory metal surface. As a result, the subsequent method steps, such as a titanium getter annealing, for cleaning the Nb discs or refractory metal discs that have been produced, can be avoided.

Wire sawing is actually intended and suitable for brittle materials, such as for Si wafers in the chip industry, or for quartz glass. Through adaptation of the cutting parameters, it is possible to cut the very soft Nb on a wire saw with thickness tolerances of 0.03 mm to 0.07 mm. Separation is achieved with this type of sawing by a grinding means in an aqueous solution, which is carried along by the cutting wire 4 and which thus slowly grinds the wire 4, 7 through the initial material 1.

Subsequently, on the basis of measurements, the content of O and H is determined in discs cut from the solid body with a method according to the invention with a wire saw and an aqueous slurry.

Grinding tests were conducted on samples of Ze, Ta and Nb, with different voltage potentials. The applied voltage was selected at −50 to +50 volts.

The samples were ground with water for 1 minute each.
The initial contents of the samples:
Zr: O content 630 µg/g H content: 2 µg/g
Ta: O content 9 µg/g H content: 1 µg/g
Nb: O content 6 µg/g H content: 1 µg/g Table 1: In Table 1 below, the measured values for the oxygen content (O content) after grinding are given in μg/g for discs cut from the solid body that are made of zirconium (Zr), tantalum (Ta) and niobium (Nb), wherein the cuts were made with the exemplary structure shown in FIG. 1 and with different electrical DC voltages. Here, the electrical potential difference between the solid body 1 and the wire 4, 7 of the wire saw is given as the electrical voltage in volts.

| Voltage [V] | Zr | Ta | Nb |
|---|---|---|---|
| −50 | 753 | 119 | 197 |
| −45 | 944 | 125 | 224 |
| −40 | 817 | 92 | 174 |
| −35 | 764 | 107 | 185 |
| −30 | 882 | 83 | 169 |
| −25 | 759 | 67 | 182 |
| −20 | 732 | 112 | 143 |
| −15 | 798 | 48 | 177 |
| −10 | 744 | 54 | 164 |
| −5 | 695 | 27 | 121 |
| 0 | 672 | 15 | 98 |
| 5 | 641 | 9 | 27 |
| 10 | 633 | 8 | 8 |
| 15 | 628 | 10 | 6 |
| 20 | 625 | 9 | 6 |
| 25 | 628 | 7 | 5 |
| 30 | 634 | 9 | 6 |
| 35 | 619 | 10 | 6 |
| 40 | 622 | 9 | 7 |
| 45 | 631 | 10 | 5 |
| 50 | 627 | 8 | 6 |

Table 2: In Table 2 below, the measured values for the hydrogen content (H content) after grinding are given in μg/g for discs cut from the solid body that are made of zirconium (Zr), tantalum (Ta) and niobium (Nb), wherein the cuts were made with the exemplary structure shown in FIG. 1 and with different electrical DC voltages. Here, the electrical potential difference between the solid body 1 and the wire 4, 7 of the wire saw is given as the electrical voltage in volts.

| Voltage [V] | Zr | Ta | Nb |
|---|---|---|---|
| −50 | 29 | 19 | 22 |
| −45 | 32 | 25 | 24 |
| −40 | 28 | 22 | 19 |
| −35 | 29 | 17 | 21 |
| −30 | 33 | 29 | 18 |
| −25 | 28 | 23 | 21 |
| −20 | 33 | 24 | 23 |
| −15 | 31 | 26 | 20 |
| −10 | 28 | 23 | 18 |
| −5 | 17 | 18 | 12 |
| 0 | 6 | 15 | 7 |
| 5 | 2 | 5 | 4 |
| 10 | 1 | 2 | 1 |
| 15 | 2 | 1 | 1 |
| 20 | 2 | 1 | 1 |
| 25 | 2 | 1 | 1 |
| 30 | 2 | 1 | 1 |
| 35 | 1 | 1 | 1 |
| 40 | 2 | 1 | 1 |
| 45 | 2 | 1 | 1 |
| 50 | 1 | 1 | 1 |

It can clearly be seen that with an applied voltage of +20 volts, no absorption of gases occurs during the aqueous grinding process. Without an applied voltage (U=0V) the gas absorptions of Zr and Ta are generally low. With Nb, there is already a drastic rise in O and H content.

FIG. 2 shows a diagram in which the RRR value of niobium (Nb) is shown in dependence on the content of O and N and the total of O and N.

Due to the melting under a vacuum of the electron beam, which occurs eight times in total, Nb is produced with particularly low gas contents. This is necessary for use in superconductive, high-frequency hollow space accelerations, in order to set the highest possible residual resistance ratio RRR. The RRR value is a comparative value for the cryogenic thermal conductivity of the material. The RRR value is significantly influenced by the proportion of interstitial elements (gas contents). In order to achieve an RRR of 300, the gas contents must be significantly less than 20 μg/g in total.

The graphic in FIG. 2 shows the dependency of the RRR value on the interstitial impurities in niobium.

The rough cylindrical solid body used has a diameter of 305 mm and a length of 1,600 mm. The gas content of the solid body is 4 to 7 μg/g N, 1 to 2 μg/g O, 1 to 2 μg/g C and less than 1 μg/g H. The solid body has an RRR value of 400.

In a first partial test, a portion of the solid body (length 300 mm) was sawed with water using a wire saw without application of a voltage (U=0V) into discs with a thickness of 2.8 mm. The structure is shown in FIG. 1. The cutting process lasts approximately 72 hours.

After cutting, the following gas contents and the resulting RRR value are found:
  N content: 4 . . . 7 μg/g
  O content: 35 μg/g
  C content: 1 . . . 2 μg/g
  H content: 40 μg/g
  RRR: 260

In a second partial test, a further partial piece (length 300 mm) of the same solid body was also sawed with an applied voltage of +30 V, into discs with a thickness of 2.8 mm. Here, the process time was also 72 hours.

After the voltage-protected cutting, the following gas contents and the resulting RRR value are found:
  N content: 5 . . . 7 μg/g
  O content: 3 . . . 7 μg/g
  C content: 1 . . . 2 μg/g
  H content: 25 μg/g
  RRR: 340

In this second partial test, after 600° C. vacuum annealing, an H content of less than 1 μg/g was achieved; the RRR value then reached 480.

Third partial test: A further Nb solid body with a diameter of 480 mm with the following initial data (gas contents) was cut into discs of 4.6 mm.
  N content: 11 . . . 13 μg/g
  O content: 7 . . . 18 μg/g
  C content: 1 . . . 2 μg/g
  H content: 1 μg/g
  RRR: 288 . . . 336

A voltage of U=+30V was also applied. The cutting duration was 100 hours.

The results after sawing:
  N content: 11 . . . 14 μg/g
  O content: 17 . . . 25 μg/g
  C content: 1 . . . 2 μg/g
  H content: 20 . . . 25 μg/g
  RRR: 220 . . . 290

In Table 3 below, the results are compiled, wherein here, the average values have been calculated with multiple measurements:

|     | Start | Sawing U = 0 V | Delta | Sawing U = 30 V | Delta |
| --- | --- | --- | --- | --- | --- |
| N   | 5.5  | 5.5 | 0    | 5.5  | 0    |
| O   | 1.5  | 35  | 33.5 | 5    | 3.5  |
| C   | 1.5  | 1.5 | 0    | 1.5  | 0    |
| H   | 1    | 40  | 39   | 25   | 24   |
| RRR | 400  | 260 | −140 | 340  | −60  |
| N   | 12   |     |      | 12.5 | 0.5  |
| O   | 12.5 |     |      | 21   | 8.5  |
| C   | 1.5  |     |      | 1.5  | 0    |
| H   | 1    |     |      | 22.5 | 21.5 |
| RRR | 312  |     |      | 255  | −57  |

Both the oxygen absorption and the hydrogen absorption can be prevented through an applied voltage for the aqueous separation of refractory metals.

In cases of long process times, with non-voltage-protected cutting, an oxygen absorption of 33.5 μg/g and a hydrogen absorption of 39 μg/g occurs.

Due to the applied voltage, the oxygen absorption can be reduced to 10 to 30%, even with extremely long process times.

For wire sawing of refractory metals, due to the thickness-dependent high process times (in the exemplary embodiments, 72 and 100 hours), a minimal oxygen absorption of 3 to 8.5 μg/g and a noticeable hydrogen absorption of 29 to 25 μg/g occurs.

The absorbed oxygen can no longer be reduced from the structure components. The hydrogen can be entirely removed by vacuum annealing, with T>600° C.

The features of the invention disclosed in the above description, and in the claims, figures and exemplary embodiment, can be essential both individually and in any combination desired for the realisation of the invention in its different embodiments.

LIST OF REFERENCE NUMERALS

1 Solid body/refractory material
2 Voltage source
3 Voltmeter
4 Copper-plated steel wire
5 Deflection roller
6 Slurry
7 Copper-plated steel wire with slurry

The invention claimed is:

1. A method for cutting refractory metals, the method comprising:
mechanically machine cutting a solid body made of a refractory metal with a cutting apparatus;
wetting the cutting apparatus with a fluid during the machine cutting, the fluid having at least 50 weight % water; and
bringing the cutting apparatus to a positive electrical potential in relation to the solid body during the machine cutting.

2. The method of claim 1, wherein a cutting surface of the solid body is oxidized by the positive electrical potential of the cutting apparatus in relation to the solid body and by the fluid, so that an oxide layer forms on the cutting surface during the machine cutting.

3. The method of claim 2, wherein due to the oxide layer formed during the machine cutting, an absorption of hydrogen and oxygen through the oxide layer into the interior of the solid body is reduced or prevented.

4. The method of claim 3, wherein due to the oxide layer formed during the machine cutting, the absorption of nitrogen and/or carbon and/or other gases through the oxide layer into the interior of the solid body is reduced or prevented.

5. The method of claim 2, wherein a disc is cut from the solid body and the oxide layer on the cutting surface of the disc is removed by pickling after the machine cutting.

6. The method of claim 2, wherein an amorphous oxide layer forms on the cutting surface.

7. The method of claim 1, wherein as the cutting apparatus, a blade of a saw device, a wire of a wire saw, a thread of a thread saw, a band of a band saw, a saw blade of a hacksaw, a circular saw blade of a circular saw, or a cutting disc is used.

8. The method of claim 1, wherein as the cutting apparatus, a wire of a wire saw or a thread of a thread saw is used, and as the fluid, an aqueous sludge is used, in which grinding particles are distributed.

9. The method of claim 1, wherein the solid body is crystalline.

10. The method of claim 1, wherein the positive electrical potential between the solid body and the cutting apparatus is created by applying an electrical voltage of at least 1 V during machine cutting.

11. The method of claim 1, wherein the positive electrical potential of the cutting apparatus in relation to the solid body is created by bringing the cutting apparatus to an electrically positive potential in relation to ground.

12. The method of claim 1, wherein the solid body consists of a refractory metal from the main chemical group IVb, group Vb or group VIb, or the solid body consists of titanium, tantalum, niobium, vanadium, zirconium, molybdenum or tungsten.

13. The method of claim 1, wherein the solid body is positioned in a bath of the fluid during the machine cutting, and the cutting apparatus is guided at least partially through the bath during the machine cutting.

14. A disc produced from a refractory metal with a method according to claim 1.

15. The disc of claim 14, wherein
an interior of the disc has an oxygen content of less than 20 μg/g and the interior of the disc has a hydrogen content of less than 10 μg/g; or
the interior of the disc has an oxygen content of less than 20 μg/g or the interior of the disc has a hydrogen content of less than 10 μg/g.

16. A disc produced from a refractory metal with a method according to claim 5, wherein the disc has an oxide layer on the cutting surface with a thickness of between 2 nm and 1,000 nm.

17. The disc of claim 16, wherein the disc has an amorphous oxide layer on the cutting surface.

18. The disc of claim 16, wherein
an interior of the disc has an oxygen content of less than 20 μg/g and the interior of the disc has a hydrogen content of less than 10 μg/g; or
the interior of the disc has an oxygen content of less than 20 μg/g or the interior of the disc has a hydrogen content of less than 10 μg/g.

19. The method of claim 1, wherein the positive electrical potential between the solid body and the cutting apparatus is created by applying an electrical voltage of between 5 V and 200 V during the machine cutting.

20. The method of claim 1, wherein the solid body consists of niobium.

* * * * *